US012130615B2

(12) United States Patent
Albertini et al.

(10) Patent No.: US 12,130,615 B2
(45) Date of Patent: Oct. 29, 2024

(54) METHOD TO RESTORE THE FUNCTIONAL STATE OF AN AUTOMATIC MACHINE FOR THE PRODUCTION OR THE PACKAGING OF CONSUMER PRODUCTS

(71) Applicant: G.D SOCIETA' PER AZIONI, Bologna (IT)

(72) Inventors: Daniela Albertini, Bologna (IT); Gianluca Bertuzzi, Bologna (IT); Luca Federici, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 113 days.

(21) Appl. No.: 17/610,138

(22) PCT Filed: May 29, 2020

(86) PCT No.: PCT/IB2020/055129
§ 371 (c)(1),
(2) Date: Nov. 9, 2021

(87) PCT Pub. No.: WO2020/240503
PCT Pub. Date: Dec. 3, 2020

(65) Prior Publication Data

US 2022/0221848 A1 Jul. 14, 2022

(30) Foreign Application Priority Data

May 30, 2019 (IT) ........................ 102019000007581

(51) Int. Cl.
*G05B 23/02* (2006.01)
*G05B 19/042* (2006.01)

(52) U.S. Cl.
CPC ..... *G05B 23/0229* (2013.01); *G05B 19/0426* (2013.01); *G05B 2219/23253* (2013.01)

(58) Field of Classification Search
None
See application file for complete search history.

(56) References Cited

U.S. PATENT DOCUMENTS 7,318,226 B2 1/2008 Chefalas et al.
9,929,881 B2 3/2018 Fisher, Jr.
(Continued)

FOREIGN PATENT DOCUMENTS

DE 102007059716 A1 6/2009
EP 0428135 A2 5/1991
(Continued)

OTHER PUBLICATIONS

International Search Report and Written Opinion for corresponding International Application No. PCT/IB2020/055129, mailing date Sep. 24, 2020.

(Continued)

*Primary Examiner* — Carlos R Ortiz Rodriguez
(74) *Attorney, Agent, or Firm* — MARSHALL, GERSTEIN & BORUN LLP

(57) ABSTRACT

A method to restore the functional state of an automatic machine for the production or the packaging of consumer products. The method comprises the steps of: storing a first knowledge base containing a plurality of problematic operating conditions having a corresponding known fault; training the data processing system by associating ate least one solution to each problematic operating condition and storing a second knowledge base containing the solution; identifying a current operating condition; searching, among all the problematic operating conditions stored in the first knowledge base, for the problematic operating condition that is the most similar to the current operating condition; and communicating to an operator the solution associated with the (Continued)

corresponding problematic operating condition and stored inside the second knowledge base.

12 Claims, 6 Drawing Sheets

(56) References Cited

U.S. PATENT DOCUMENTS

| | | | |
|---|---|---|---|
| 2007/0288795 | A1 | 12/2007 | Leung et al. |
| 2015/0346066 | A1 | 12/2015 | Dutta et al. |
| 2019/0129405 | A1 | 5/2019 | Cella et al. |

FOREIGN PATENT DOCUMENTS

| | | | |
|---|---|---|---|
| EP | 0548777 | A1 | 6/1993 |
| WO | WO-90/05337 | A2 | 5/1990 |

OTHER PUBLICATIONS

Observations by a Third Party Focke & Co (CmbH & Co. KG) against G.D Societa Per Azioni for Corresponding European Patent Application No. 20734810.3, dated Oct. 11, 2022.

METHOD TO RESTORE THE FUNCTIONAL STATE OF AN AUTOMATIC MACHINE FOR THE PRODUCTION OR THE PACKAGING OF CONSUMER PRODUCTS

CROSS-REFERENCE TO RELATED APPLICATIONS

This patent application is a U.S. national phase of International Patent Application No. PCT/IB2020/055129 filed May 29, 2020, which claims the benefit of priority from Italian patent application no. 102019000007581 filed on May 30, 2019, the respective disclosures of which are each incorporated herein by reference in their entireties.

TECHNICAL FIELD

This invention relates to a method to restore the functional state of an automatic machine for the production or the packaging of consumer products.

This invention finds advantageous application in restoring the functional state of an automatic packaging machine for packets, to which the following description specifically refers but without any loss of generality thereby.

PRIOR ART

An automatic packaging machine usually comprises a plurality of actuators that act on consumer products (e.g. cigarette packets, food, or sanitary pads, etc.) to change their shape, structure, or position. Generally, actuators are electric motors or pneumatic cylinders and are firmly connected to mechanical parts with different shapes and sizes designed to process the consumer products.

Due to the continuous increase in production volumes, these automatic machines are subject to increasing complexity, both with regard to mechanical parts, which have to occupy less and less space and perform increasingly complex operations, and with regard to the increase in the automatic machine's active components, such as motors and/or sensors. This increasing complexity makes it increasingly difficult to identify and solve the various faults that may occur due to dirt, wear, mechanical parts breakage, incorrect calibration, or inaccurate assembly of a component, etc.

This problem is aggravated in the case of several machines connected in a row. The presence of manuals and catalogues relating to the resolution of faults, as well as increasingly sensorized and precise diagnostic systems, are not able, however, to suggest, with precision, a decisive solution for all possible faults, which allows the functional state to be restored in the shortest possible time, to an operator. Therefore, the identification and resolution of a fault leads to considerable losses in production time.

Moreover, in most cases, once a fault has been resolved, the solution is not recorded, shared, or associated with the operating condition of the automatic machine and, therefore, if a machine has a similar fault to one already resolved on another machine in the same or another plant, the solution must be sought independently in both cases, without being able to make use of the work already done for the other.

DESCRIPTION OF THE INVENTION

The purpose of this invention is to provide a method to restore the functional state of an automatic machine for the production or packaging of consumer products that is free of the drawbacks described above and, at the same time, is simple and economical to implement.

In accordance with this invention, a method is provided to restore the functional state of an automatic machine for the production or the packaging of consumer products, as claimed in the attached claims. An automatic machine for the production or the packaging of consumer products, designed to implement the above-mentioned method, is also provided.

The claims describe preferred embodiments of this invention, forming an integral part of this description.

BRIEF DESCRIPTION OF THE DRAWINGS

This invention will now be described with reference to the appended drawings, illustrating some non-limiting embodiments thereof, wherein.

PREFERRED EMBODIMENTS OF THE INVENTION

Figure 1:
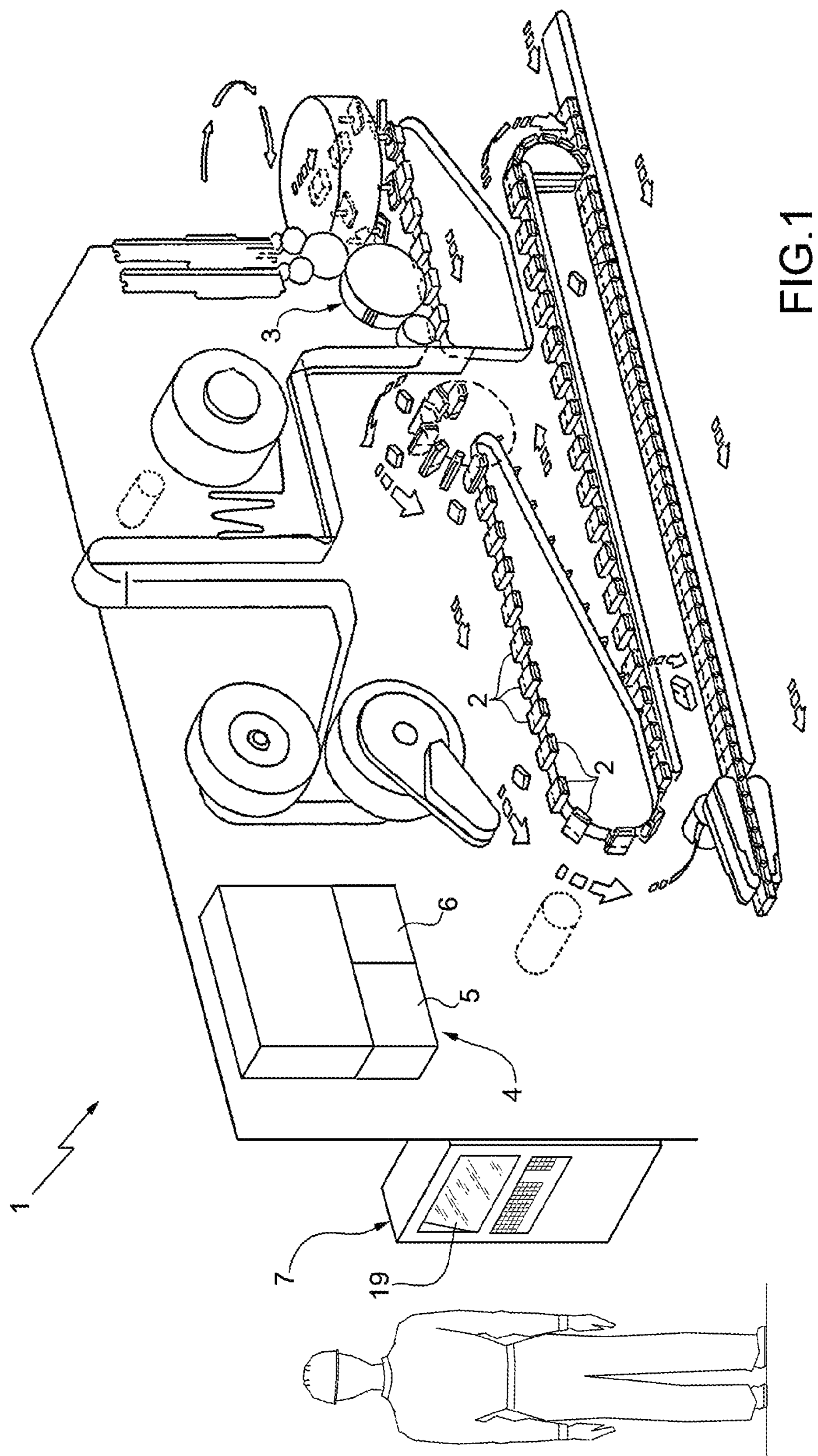
FIG. 1 is a perspective and schematic view of an automatic packaging machine for the production of packets, FIG. 2 schematically illustrates the structure and connection between a first and a second knowledge base, which in turn are connected to a data processing system and an interface.

FIG. 1 illustrates an automatic machine 1 for the production of consumer products, in particular an automatic packaging machine 1 for the application of a transparent overwrap to cigarette packets. According to a first aspect of this invention, a method to restore the functional state of at least one part of the automatic machine 1 is provided. The term "functional state" refers to an operating condition of the automatic machine 1, i.e. a condition wherein the automatic machine 1 is switched on and free of errors (faults, failures) that hinder its production.

The automatic machine 1 comprises a plurality of movable operating members designed to process consumer products (cigarette packets 2 in the embodiment illustrated in FIG. 1). In particular, the automatic machine 1 comprises a part 3 (illustrated in more detail in FIG. 4) equipped with a set of actuators.

According to some preferred but non-limiting embodiments, such as those illustrated in the attached figures, the actuators comprise electric motors (in particular brushless motors). According to other non-limiting embodiments, the actuators also comprise types of drives other than electric motors (for example, pneumatic or hydraulic cylinders, electric activation cylinders, etc.).

The automatic machine 1 also comprises a control unit 4 designed to control the state, position, and dynamics of the movable operating members (and, thus, the actuators as well) of the automatic machine 1, and a data processing system 5, designed to carry out complex computing and/or comparison operations and with a large number of variables. For example, the data processing system 5 can be a computer, a processor, or a circuit board, etc.

Figure 2:
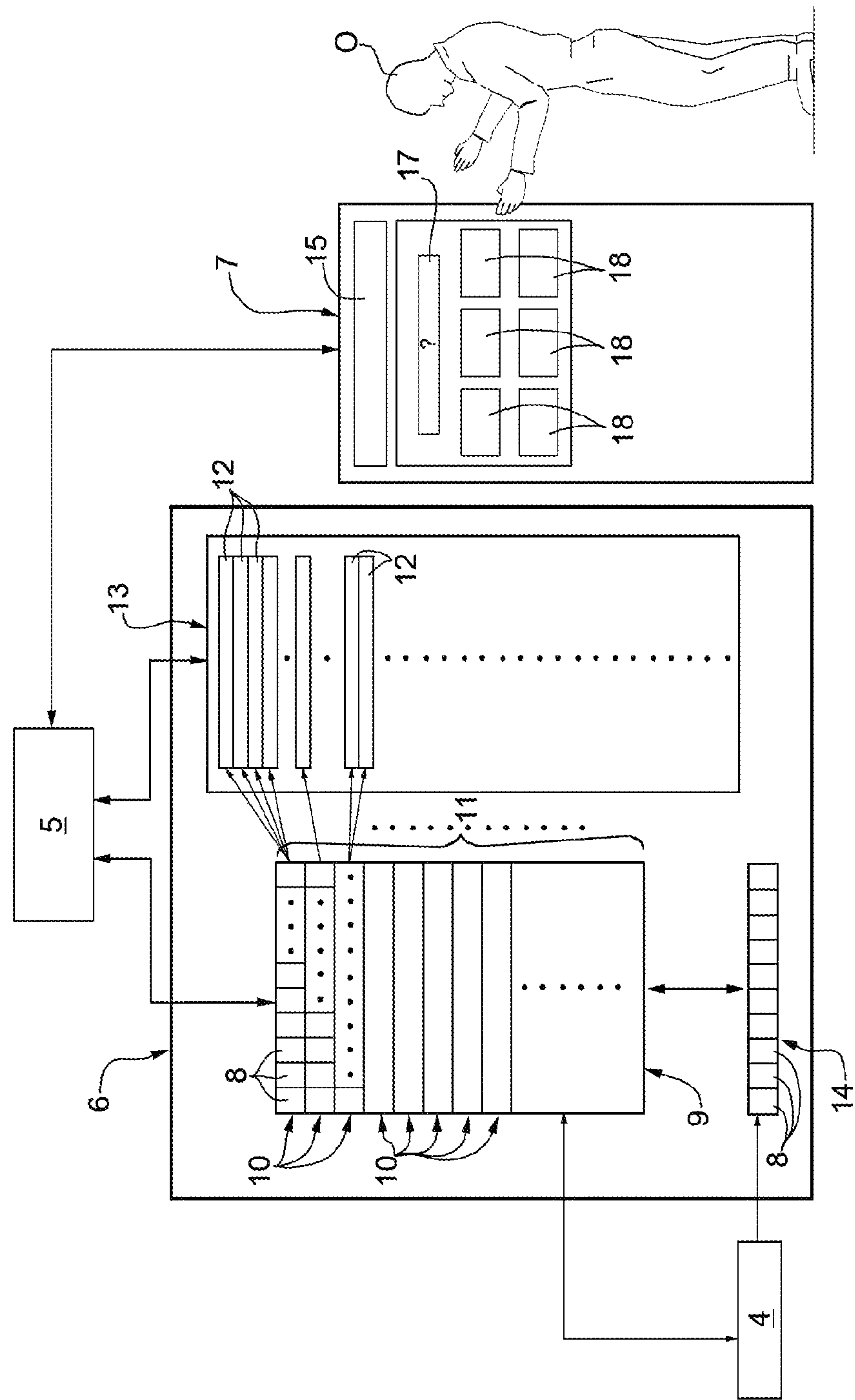

Advantageously, and as illustrated in the non-limiting embodiment in FIG. 2, the automatic machine 1 comprises a writable memory 6 (especially a non-volatile one), which is connected to the data processing system 5, and a user interface device 7, which is also connected to the data processing system 5.

According to some non-limiting embodiments, which are not illustrated, the control unit comprises the processing system 5 and the writable memory 6.

The automatic machine 1 (especially the part 3) has different components that may cause a plurality of faults. For example: a motor may cause a fault due to excessive current demand due to dirt or interference; a component may break or dismantle (e.g. due to vibrations) and cause a sudden lowering of the current demanded by a motor; a photocell may become dirty or generate errors due to incorrect calibration; a mechanical component may be mounted incorrectly or inaccurately and, therefore, have different inertial values than expected, or cause a certain number of consecutive rejects, etc.

The method in accordance with this invention comprises a one-time step for identifying a list of all the operating variables 8 that characterise the operation of the automatic machine 1 (as illustrated in FIG. 2).

The term "operating variables" refers to all those values that indicate a condition of one part or of one component of the automatic machine 1.

By way of non-limiting example, the following are to be considered operating variables 8: the feedback of any sensor; the humidity of the environment wherein the automatic machine 1 is located; the value of an encoder; the status, position, speed, or acceleration of a motor; a machine status (alarm, warning, production, emptying, change of format, end of shift, etc.); a calibration parameter; an inertial parameter; an electrical current; the values of a relay; the values of a pneumatic system (vacuum suction); production counters (number of packets 2 produced, number of packets 2 discarded, material consumption, etc.); analogical control variables (e.g. glue level or temperature of a gumming machine, fill level or temperature of a lung, lubricating oil level and temperature, temperature of a heater or dryer or welder); digital control variables (e.g. presence of a new reel in an unwinding spindle); or the image from a quality inspection camera, etc.

In addition, the method comprises the step of storing, once and inside the writable memory 6, a first knowledge base 9 containing a plurality of problematic operating conditions 10, each consisting of a set of values associated with the operating variables 8 and of at least one corresponding known fault 11. In other words, as illustrated in FIG. 2, a plurality of conditions 10 are stored inside the knowledge base 9 that correspond to various states of the automatic machine 1 in the presence of known faults 11. The method comprises the additional step of training, once, the data processing system 5, associating at least one solution 12 to each problematic operating condition 10 and storing, inside the writable memory 6, a knowledge base 13 containing the solution.

The term "once" means "one time". In particular, it means "each and every time the set of operating variables 8 is changed" (for example, due to the addition or removal of an actuator, the replacement of a sensor). In other words, each and every time an operating variable 8 is added or removed. In these cases, the addition or removal of problematic operating conditions 10 from the knowledge base 9 takes place (the same takes place with the solutions 12 stored in the knowledge base 13). For example, if a photocell is added for controlling the presence of a film, the knowledge bases 9 and 13 will be updated, including the case in which the film is present and in which the film is not present (thus, broken and needing to be reinserted in the machine).

In the non-limiting embodiment in FIG. 2, the first problematic operating condition 10 is associated with four solutions 12, the second problematic operating condition 10 is associated with a single solution 12, the third problematic operating condition 10 is associated with two solutions 12, etc.; in general, each problematic operating condition 10 is associated with at least one solution 12. Problematic operating conditions 10 are associated with several solutions 12 (two, three, or four, etc.) if the same problematic operating condition 10 represents the status of the automatic machine 1, the cause of various known faults 11.

Advantageously, but not necessarily, the steps illustrated up to this point are implemented during the development of the automatic machine 1, in particular before the automatic machine 1 is sent to a customer or, in any case, before the automatic machine 1 enters (or re-enters after mechanical, electric, or software changes) into production.

Advantageously, the method comprises the additional step of identifying, through the control unit 4, a current operating condition 14 consisting of a set of current operating variable 8 values. In other words, during this step, the control unit 4 registers the current values of the operating variables 8 and saves them. In some non-limiting cases, these current values are saved inside a volatile memory. In other, non-limiting cases, these values are saved inside a permanent memory, in particular in the writable memory 6.

In some non-limiting embodiments, the current operating condition 14 is identified following an unknown fault 15, or an alarm and/or stopping, of the automatic machine 1. In particular, the unknown fault 15 of the automatic machine is shown to the operator through the interface device 7.

In other non-limiting embodiments, the current operating condition 14 is identified during the production of the automatic machine 1, to prevent any unknown fault 15. For example, in the part 3 of the automatic machine 1 (illustrated in FIG. 4), a wheel 21 is present, which can be monitored during production. In particular, it is possible to control the torque (or electric current) required by an electric motor that moves the wheel 21, or the inertia detected by a drive that controls the motor. In this way, it is possible to check that the wheel is not subject to any slowing down due to dirt (for example, tobacco that escapes the packets 2 or glue that is spread during the movement of the packets 2 themselves) and that it is correctly mounted (that it has, in other words, a known inertia, in particular a constant one being a basically cylindrical body).

Advantageously, but not necessarily, the current operating condition 14 is identified at regular intervals in order to check that the current values of the operating variables 8 are correct, including during production, and that there aren't any imminent, unknown faults 15.

According to a non-limiting embodiment, the values of the operating variables 8 are compared to the reference values in light of a tolerance range, with thresholds placed at distances equal or different to the reference value.

Figure 3:
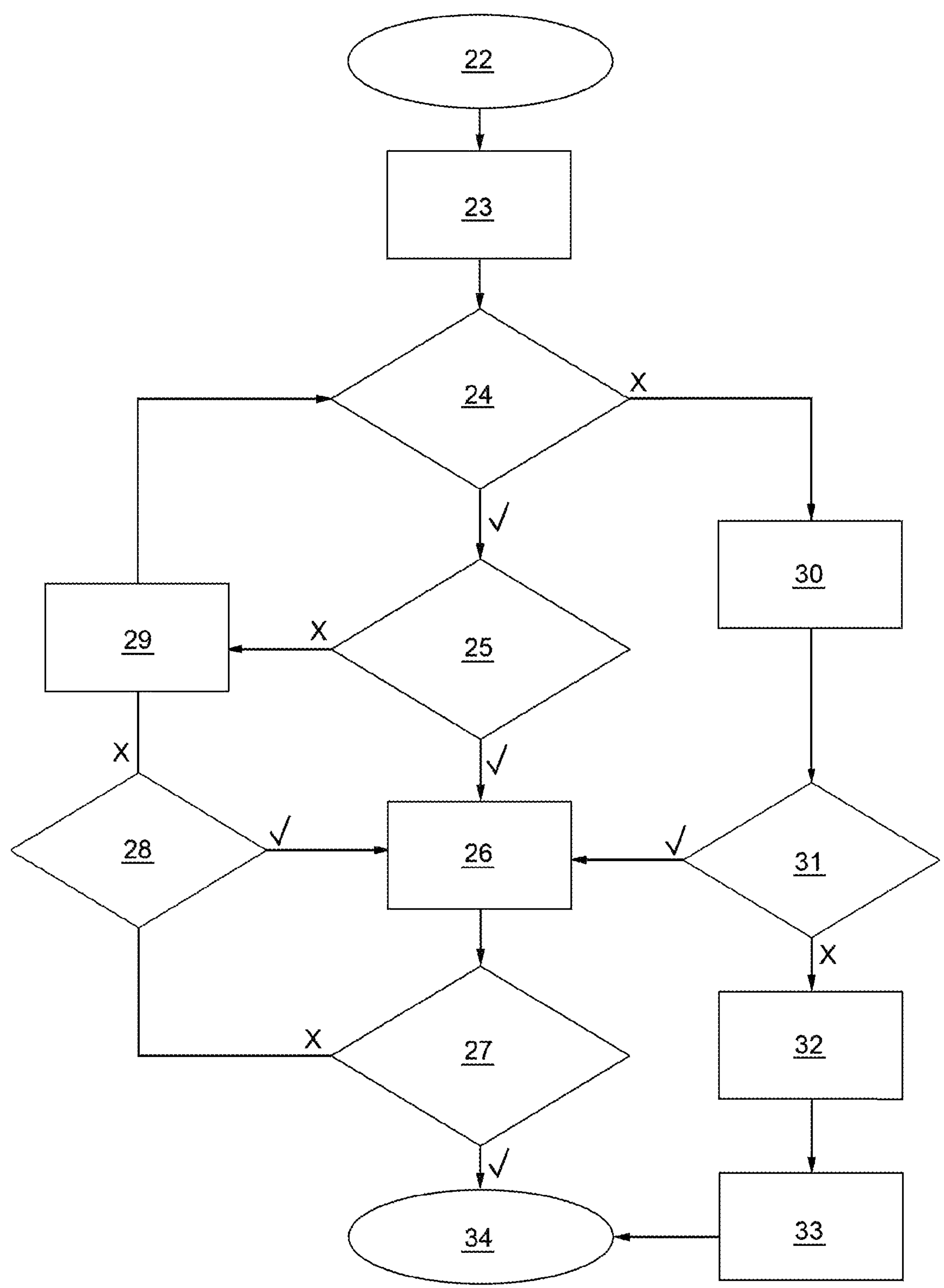
FIG. 3 illustrates a possible flow chart of the general steps of the method and how they can be connected.

In the flow chart in FIG. 3, the convention is used according to which the oval blocks indicate the beginning or end of the chart, the rectangular ones indicate a generic instruction, and the rhomboid ones, placed at a branching off, are optional blocks, containing a logic condition that determines the direction the flow will take. In particular, at the optional blocks, the flow of the chart branches off in the direction marked by the check mark "✓" if the logic condition is satisfied; otherwise, if this condition is not satisfied, the flow branches off in the direction marked by the symbol "X".

In use, as illustrated in the flow chart in FIG. 3, if the control unit 4 verifies the presence (or imminent presence) of an unknown fault 15 (initial block 22 in the chart), the method involves interrogating the operating variables 8 so as to determine the current operating condition 14 (block 23) of the automatic machine 1.

Following this step, the method comprises the additional step (block 24) of searching, among all the problematic operating conditions 10 stored in the first knowledge base 9, for the problematic operating condition 10 that is the most similar to the current operating condition 14.

Advantageously, but not necessarily, in order to speed up the search for a solution 12, the control unit 4 initially inspects the knowledge base 9 in the search for a (substantial) match (i.e. a match between operating variables 8 greater than at least, for example, 90%) between the current operating condition 14 and (at least) one problematic operating condition 10 (block 25).

In the non-limiting embodiment in FIG. 3, if there is at least one problematic operating condition 10 inside the knowledge base 9 that matches the current operating condition 14, the method comprises the step of communicating (block 26) the solution 12 (or the solutions 12) associated with the matching problematic operating condition 10, and stored inside the knowledge base 13, to the operator O.

In the non-limiting embodiment of the attached figures, this communication takes place through the user interface device 7 (human-machine interface—HMI), which is of the video type, in particular with a touchscreen 19, as illustrated in FIGS. 1, 2, and 4-6.

In other non-limiting embodiments that are not illustrated, the interface device 7 is of another type (for example, one capable of interpreting audio or movements).

According to some non-limiting embodiments that are not illustrated, the solutions 12 are communicated to the operator O (block 26) through a single interface device 7 screen and are (in particular) ordered in descending order starting with the solution 12 to the problematic operating condition 10 with the closest match to the current operating condition 14 and finishing with the solution 12 to the condition 10 most unlike (within a pre-established limit, for example, three or five) the condition 14. In other words, the solutions 12 are provided all together to the operator O and ordered from the most probable to the least probable.

According to other non-limiting embodiments that are not illustrated, the solutions 12 are communicated to the operator O one at a time, through different screens, from the most probable to the least probable (block 26).

Advantageously but not necessarily, if there is an acceptable match (above a predefined threshold value) between the operating variables 8 of the current operating condition 14 and the operating variables 8 of at least one of the problematic operating conditions 10, then if a corresponding solution 12 is communicated to the operator O, the data processing system 5 will ask the operator O to confirm the effectiveness of the communicated solution 12 (block 27).

In the non-limiting embodiment in FIG. 3, if the solution 12 communicated to the operator O in block 26 is not decisive, i.e. if the operator O replies negatively to the confirmatory request (block 27) regarding the effectiveness of the solution 12 proposed by the data processing system 5, then the control unit 4 (or data processing system 5) checks for other solutions 12 (block 28) and, if this solution is present inside the knowledge base 13, the data processing system 5 communicates an alternative solution 12 to the unknown fault 15 to the operator (the flow of the chart in FIG. 3 returns to block 26).

In other cases, if the solution 12 communicated to the operator O is not correct and there are no alternative solutions 12 to the unknown fault 15 (or there are too many) inside the knowledge base 13, then the data processing system 5 actively interacts with the operator O (block 29), in particular through the user interface device 7, (asking for and) obtaining additional information and processing one or more additional solutions.

In the non-limiting embodiments in the attached figures, this interaction takes place through the video interface device 7. In these cases, advantageously but not necessarily, the data processing system 5 asks the operator O to confirm the efficacy of one or more additional alternative solutions proposed as a result of the interaction.

According to the non-limiting embodiment illustrated in FIG. 3, as a result of the interaction between the data processing system 5 and the operator O (block 29), the data processing system 5 processes the new information obtained by the operator O to understand whether problematic operating conditions 10 similar to the current ones 14 exist in the knowledge base 9 (block 24).

According to other non-limiting embodiments that are not illustrated, as a result of the interaction between the data processing system 5 and the operator O (block 29), the data processing system 5 processes the new information obtained by the operator O in order to provide the operator with other solutions 12 (exiting block 29 you enter block 26 again).

In particular, if there are too many possible solutions 12, the data processing system selects the most likely solutions 12, using the information obtained from the interaction (block 29) between the operator O and the data processing system 5. For example, if a pusher piston of the part 3 does not finish its stroke due to interference or dirt obstructing its passage, the data processing system 5 asks the operator O whether or not he sees dirt in the part 3 of the automatic machine 1. Based on the operator's response, the data processing system discards one of the possible alternatives and proposes the correct one and how to resolve it (for example, replacing a piece or stopping the machine and cleaning the dirt).

Figure 4:
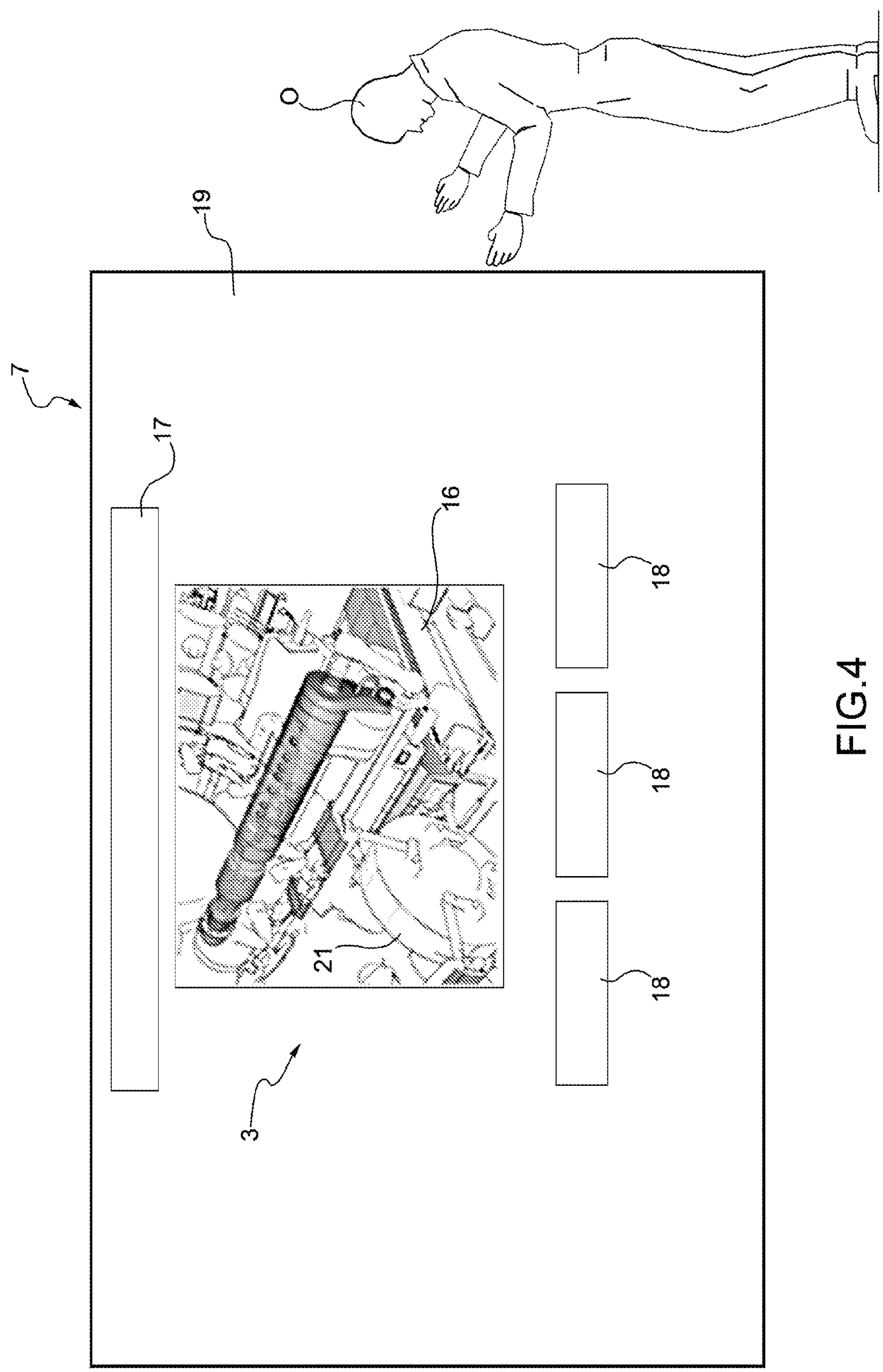
FIGS. 4, 5, and 6 illustrate possible screens of the interface in FIG. 2 through which an operator interacts with the data processing system.
Figure 5:
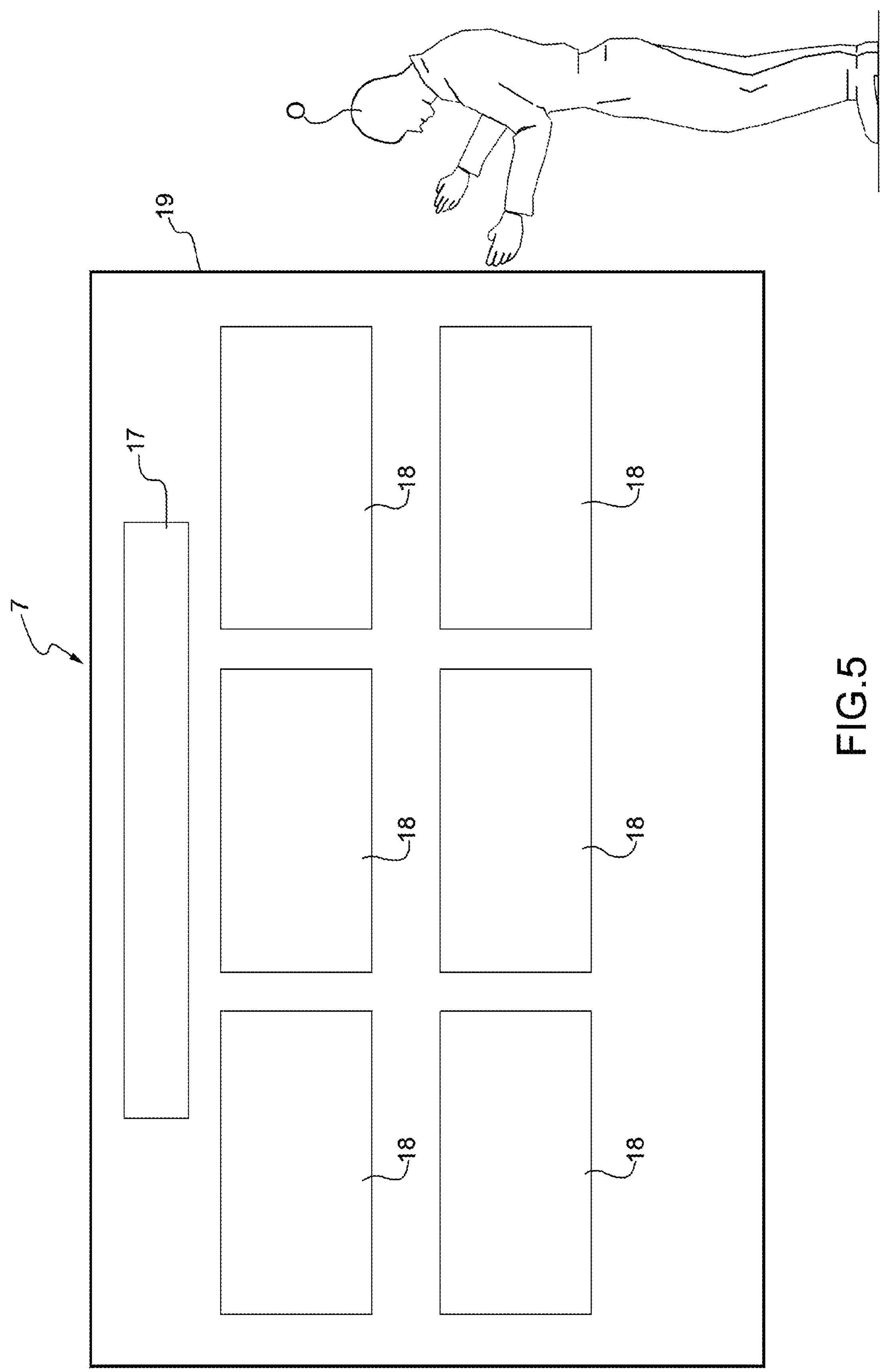

Advantageously, but not necessarily, and as illustrated in the non-limiting embodiment in FIGS. 2, 4, and 5 (screens), during the interaction (block 29, FIG. 3), the data processing system 5 poses structured questions 17 to the operator O.

Figure 6:
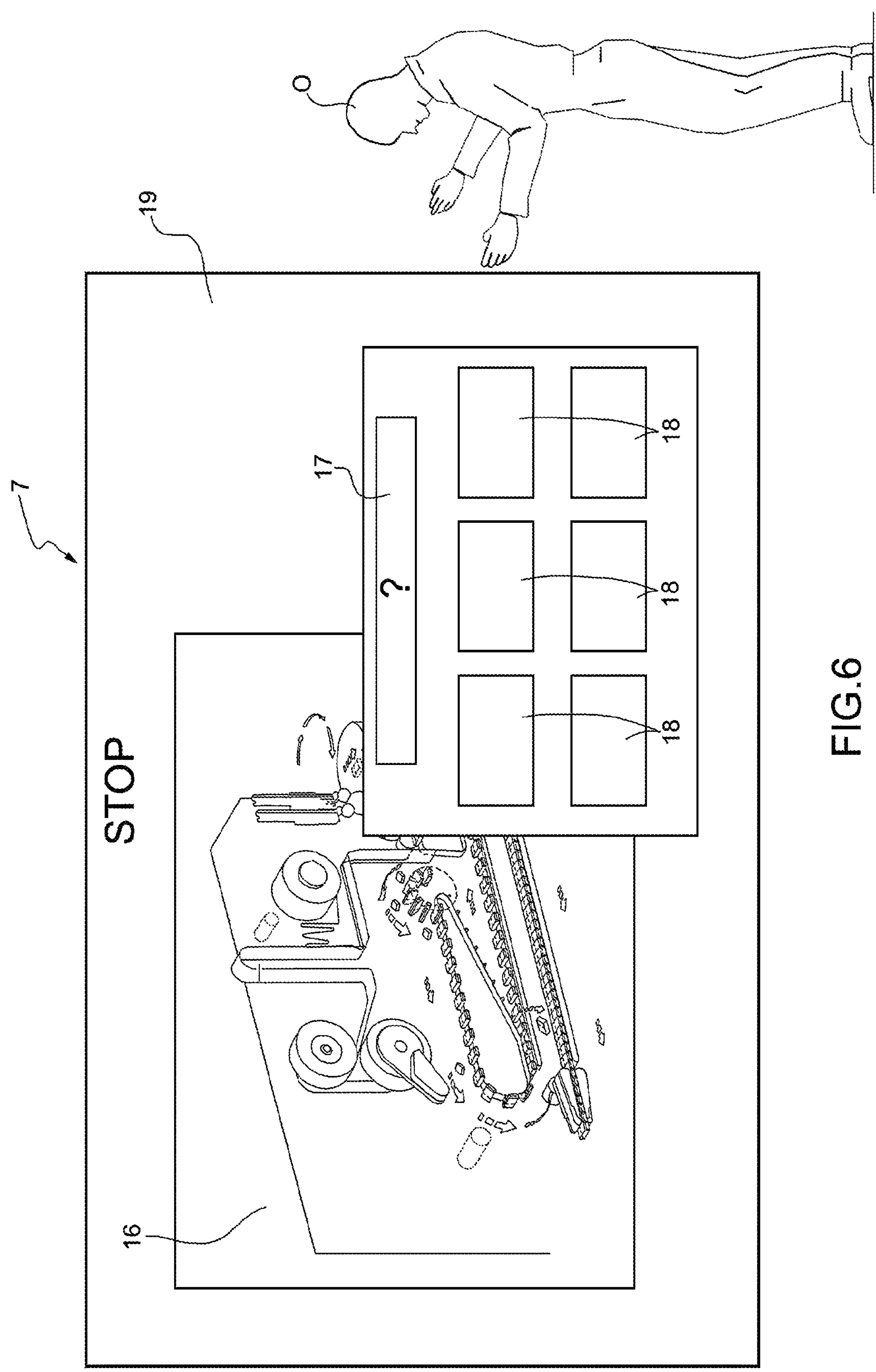

In the non-limiting embodiment in FIGS. 2, 5, and 6, such structured questions 17 are questions with closed answers. In particular, the operator O can only respond to the structured questions 17 by selecting one of the responses 18. In this way, the data processing system 5 does not allow the operator O to respond by using a keyboard and prevents the operators' differences in language or ways of expressing themselves from influencing the understanding of the unknown faults 15.

Preferably, but not necessarily, the operator O selects one of the responses 18 through the interface device 7.

Advantageously, but not necessarily, as illustrated in FIGS. 4 and 6, in order to speed up the method to restore the functional state of the machine 1, during the interaction (block 29), the operator O indicates the part 3 of the automatic machine 1 subject to the unknown fault 15 to the data processing system 5, especially through the user interface device 7.

Advantageously, but not necessarily, the operator O indicates a sub-part of the part 3 of the automatic machine subject to the fault to the data processing system 5.

In the non-limiting embodiment in FIGS. 4 and 6, the operator O indicates the part 3 based on a three-dimensional model 16 of the automatic machine 1. In particular, the operator selects the part 3 through the interface device 7 (touching the touchscreen 19). In this way, the data processing system is able to exclude all the problematic operating conditions relating to other parts of the automatic machine 1 (and thus avoids proposing useless solutions 12 to the operator).

The operator can also select several parts 3 of the automatic machine 1 through the interface device 7. This function is particularly useful since, given the complexity of the automatic machine 1, the fact that a fault 15 occurs in one part 3 of the machine 1 does not mean that the cause of the fault 15 can be identified in the same part 3.

Advantageously, but not necessarily, in the absence of solutions 12 inside the knowledge base 13 (thus, in the absence of problematic operating conditions 10 that match the current operating condition 14 determined by the unknown fault 15), the data processing system 5 processes the additional alternative solutions based on artificial intelligence algorithms (block 30 in FIG. 3).

In other words, the data processing system 5 uses algorithms that are known in information science or artificial intelligence systems, such as, for example, decision trees, Bayes classifiers, support vector machines (SVM), set methods, statistical analyses (of the main components), or neural networks, to analyse the various operating conditions (problematic and current) to find a solution 12 associated with a problematic operating condition 10 similar to the current operating condition 14. The term "similar" refers to those problematic operating conditions 10 that have at least 70% (in particular, 80%, more precisely, 90%) of the operating variable 8 values basically matching the operating variable 8 values of the current operating condition 14. In any case, the remaining match percentage identifies missing information, which is, preferably, requested from the operator O, as described below.

Advantageously, but not necessarily, if the data processing system 5 finds at least one solution 12 that resolves a known fault 15 associated with a different problematic operating condition 10 that is different but similar to the current operating condition 14 (block 31), it is communicated to the operator O (the flow of the chart in FIG. 3 returns to block 26 from bock 31).

As an alternative, or in addition, in the absence of solutions 12 inside the knowledge base 13 (thus, in the absence of problematic operating conditions 10 that match the current operating condition 14 determined by the unknown fault 15), the processing system 5 interacts with the operator O through the interface device 7 to acquire additional information on the status of the automatic machine 1 (block 32).

Advantageously, but not necessarily, the method comprises an additional step in which the data processing system 5 updates the knowledge base 9 and/or 13 and/or establishes connections between the elements inside the knowledge base 9 and/or 13 based on new alternative solutions 12 processed as a result of the interaction with the operator O or as a result of the processing through artificial intelligence algorithms.

In the non-limiting embodiment illustrated in the chart in FIG. 3, if none of the additional alternative solutions 12 processed by the data processing system 5 solve the unknown fault 15, the data processing system 5 learns, from the responses 18 of the operator O to the structured questions 17 (in particular posed through decision tree systems), a new solution 20 for the unknown fault 15 and stores this new solution 20 inside the second knowledge base 13, associating it with the current operating condition 14, which is, in turn, stored inside the knowledge base 9 as a new known problematic operating condition 10.

Advantageously, but not necessarily, the method comprises a machine learning step (block 33) performed by the data processing system 5 based on the information stored in the writable memory 6 and/or based on the information obtained from the interaction (block 32) between the data processing system 5 and the operator O, which is performed through the user interface device 7, in particular based on the responses 18 of the operator O to the structured questions 17.

In the non-limiting embodiment in FIG. 6, the data processing system 5 interrogates the operator O, asking which actions are (or were) necessary to resolve the unknown fault 15. The actions requested by the data processing system 5 belong to a predefined set of known actions (adjustments, calibrations, manoeuvres, component or wrapping material replacement, removal of dirt or cause of flooding, lubricant or glue addition, etc.). However, if the predefined set of known actions does not contain the one necessary to resolve the unknown fault 15, the data processing system 5 is able to learn new actions from the operator O and to propose them for the resolution of a successive unknown fault 15 through the user interface device 7.

In this way, the data processing system 5 obtains information to make analyses based on learning algorithms known from computer technology, such as computational statistics, pattern recognition, artificial neural networks, adaptive filtering, dynamic systems theory, image processing, data mining, adaptive algorithms, etc. In other words, during the above-mentioned method, the data processing system 5 assesses the operating variables 8 that characterise the current operating condition 14 (constituted, precisely, of a set of current operating variable 8 values). The current operating condition 14 then determines the "problem to be solved". In the event that there is no problematic operating condition 10 and no matching known solution inside, respectively, the first knowledge base 9 and the second knowledge base 13, the processing system 5 recovers the missing information (not traced by the specific type of machine) from a similar problematic operating condition (as previously described) asking, for example, the operator O to choose among pre-classified alternatives in order to bridge the missing percentage and identify the most probable one of similar conditions.

In particular, this is the identification and insertion step for a new problematic condition 10, until now unknown, in the knowledge base 9 of the problematic operating conditions 10.

The method involves, thus, processing the above-mentioned missing information through one of the artificial intelligence techniques mentioned above. Specifically, when a new problem occurs, the processing system 5 must identify "similar problems", in particular those already resolved beforehand and propose the matching solution to the operator O. More specifically, if the solution 12 were effective, a new problem (i.e. problematic operating condition)—pair would be inserted in the processing system 5, or in the knowledge bases 9 and 13, respectively. For example, the new problem-solution pair could be a new node of an artificial neural network or a new branch of a decision tree (or of a deep forest system).

Specifically, if the solution 12 highlighted were not present in the knowledge base 13 of solutions, the data processing system 5 ensures it is automatically inserted in the knowledge base 13 and for pairing the new solution 12 with the new problematic operating condition 10 identified.

In this way, the method self-supplies and improves its own efficacy with use. In detail, the presence of a first knowledge base 9 and of a second knowledge base 13 composed, respectively, of a certain number of problems (problematic operating conditions 10) and corresponding solutions 12, is necessary. To construct and widen these knowledge bases 9 and 13, part of the information is recuperated from the machine 1 during its operating cycle, others are requested from the operator O.

During the learning step, the method enables the information not automatically provided by the machine 1 to be integrated with human experience (by the operator O, based on the interventions and changes he/she makes). If there is a problem, the user interface (graphic) device 7 of the machine 1 proposes a choice among possible options to the operator O in order to thoroughly characterise both the current operating condition 14 and the solution 12.

In some non-limiting embodiments, the transmission of information for the machine learning step, or for manual learning, following an unknown fault 15 for which the data processing system 5 has found no solution 12, takes place through a direct connection between the user interface device 7 and the data processing system 5.

In some non-limiting cases, the operator O interacts directly with the data processing system 5 through the interface device 7 to provide the data necessary for the machine learning step (block 33). In other non-limiting cases, the operator O interacts directly with the data processing system 5 by connecting a computer via cable or a short-range network, through which he/she provides the processing system 5 with the data necessary to perform the machine learning. In other non-limiting cases, the operator O interacts directly with the data processing system 5 by connecting a portable storage device (e.g. USB stick or SD card) to it.

In other non-limiting embodiments, the transmission of information for the machine learning step, or for manual learning, following an unknown fault 15 for which the data processing system 5 has found no solution 12, takes place through a remote connection, in particular through distributed architecture (e.g. an intranet network, intranet, or cloud), between the user interface device 7 and the data processing system 5. In this way, the operator O can immediately restart production following the restoration of the functional state, without losing time to provide information relating to the solution 12 activated to the data processing system 5. For example, the operator O can connect to the automatic machine remotely once production has restarted in order to provide the system 5 with additional information for the machine learning step.

In particular, in use, when the learning step is considered sufficient, the data processing system 5, communicating to the user interface device 7, when a problem occurs is able to propose the solution matching the most similar "problem" previously "learned" to the operator O.

Advantageously, but not necessarily, the knowledge bases 9 and 13 are common to several automatic machines 1 of the same type and/or designed to produce the same product. In this way, it is possible to use more complete knowledge bases (trained by several different operators on different machines) and, thus, capable of providing effective solutions 12 and for a greater quantity of faults 15.

According to an additional aspect of this invention, an automatic machine 1 for the production or the packaging of consumer products is provided, inside of the writable memory 6 of which the knowledge bases 9 and 13 are stored containing, respectively, a plurality of possible problematic operating conditions 10 (each associated with a known fault 11) of the automatic machine 1 and at least one solution 12 for each known fault 11. In particular, the automatic machine 1 is designed to perform the method described above.

Although the invention described above makes particular reference to a very precise embodiment, it is not to be considered limited to such an embodiment, since it covers all those variants, modifications, or simplifications that would be evident to the expert in the field, such as: the addition of additional steps, different types of interaction, the use of models or algorithms other than those mentioned above, etc.

This invention has several advantages.

First of all, it improves the efficiency of restoring the functional state of an automatic machine for the production of consumer products caused by dirt, wear, breakage of mechanical parts, incorrect calibration, or incorrect assembly of a component.

In addition, this efficiency is increased without the need for an experienced operator to intervene to understand what the fault was and what caused it. In fact, it is the automatic machine itself that suggests which fault occurred to the operator and how to solve it.

In addition, the invention described above allows the automatic machine to be trained (independently or by an operator) so that, once a fault has occurred due to (for example) dirt, wear, incorrect assembly, or calibration of components, the machine itself can suggest the right solution to an operator when this fault occurs again. In this way, even if there has been a change of operator between the previous fault and the current one, the solution that has solved this fault in the past is, nonetheless, suggested.

In addition, this invention makes it possible to create a shared knowledge (common to several machines of the same type), which makes it possible to speed up the process of restoring the functional state because, if a fault has already been solved on any of the machines, this solution will be known to all the other machines, which will be able to provide it promptly to an operator in the event that this fault occurs again.

The invention claimed is:

1. A method to restore the functional state of at least part (3) of an automatic machine (1) for the production or the packaging of consumer products;

the automatic machine (1) comprises a plurality of movable operating members, a control unit (4), a data processing system (5), a writable memory (6) connected to the data processing system (5), and a user interface device (7) connected to the data processing system (5);

the method comprises the steps of:

identifying, for one time only, a list of all the operating variables (8) characterizing the operation of the automatic machine (1);

storing, for one time and inside the writable memory (6), a first knowledge base (9) containing a plurality of problematic operating conditions (10), each consisting of a set of values associated with the operating variables (8) and of at least one corresponding known fault (11);

storing, for one time and inside the writable memory (6), a second knowledge base (13) containing a corresponding solution (12) for each known fault (11) of the first knowledge base (9);

identifying, through the control unit (4) and following or prior to an unknown fault (15) of the automatic machine (1), a current operating condition (14) consisting of a set of current values of the operating variables (8);

searching, among all the problematic operating conditions (10) stored in the first knowledge base (9), for the problematic operating condition (10) that is the most similar to the current operating condition (14); and communicating, in case inside the first knowledge base (9) there is at least one problematic operating condition (10) matching the current operating condition (14), to an operator (O) the solution (12) associated with the matching problematic operating condition (10) and stored inside the second knowledge base (13); wherein the data processing system (5) asks the operator (O) for a confirmation of the effectiveness of the communicated solution (12); if the communicated solution (12) is not decisive and there are no alternative solutions (12) for the unknown fault (15) inside the second knowledge base (13), the data processing system (5) actively interacts with the operator (O), through the user interface device (7), obtaining additional information and processing one or more additional alternative solutions (12); the method also comprises a machine learning step (30) performed by the data processing system (5) on the basis of the interaction between the data processing system (5) and the operator (O), performed through the user interface device (7).

2. The method according to claim 1, wherein, if the communicated solution (12) is not decisive, the data processing system (5) communicates to the operator (O) at least one alternative solution (12) for the unknown fault (15), if it exists inside the second knowledge base (13).

3. The method according to claim 1, wherein the data processing system (5) asks the operator (O) for confirmation of the effectiveness of said one or more additional alternative solutions (12).

4. The method according to claim 1, wherein, during the interaction, the data processing system (5) asks the operator (O) structured questions (17).

5. The method according to claim 1, wherein, during the interaction, the operator (O) indicates to the data processing system (5), through the user interface device (7), the part (3) of the automatic machine (1) suffering from the unknown fault (15) based on a three-dimensional model (16) of the automatic machine (1).

6. The method according to claim 1, wherein the data processing system (5) processes the additional alternative solutions (12) based on artificial intelligence algorithms, communicating to the operator (O) at least one solution (12) to a known fault (11) associated with a different problematic operating condition (10), which is, however, similar to the current operating condition (14).

7. The method according to claim 6, wherein the data processing system (5) updates the first and/or the second knowledge base (9, 13) and/or establishes connections between the elements inside the first and the second knowledge base (9, 13) based on the additional alternative solutions (12) processed following the interaction with the operator (O).

8. The method according to claim 1, wherein the machine learning step (30) takes place by means of a direct connection between the user interface device (7) and the data processing system (5).

9. The method according to claim 1, wherein the machine learning step (30) takes place by means of a remote connection, in particular thorough distributed architecture, between the user interface device (7) and the data processing system (5).

10. The method according to claim 1, wherein the first and the second knowledge base (9, 13) are shared by different automatic machines (1), in particular of the same type and/or designed to produce the same product.

11. The method according to claim 1, wherein, if none of the alternative solutions (12) processed by the data processing system (5) solve the unknown fault (15), the data processing system (5) learns, from the answers (18) of the operator (O) to the structured questions (17), a new solution (20) for the unknown fault (15) and stores this new solution (20) inside the second knowledge base (13), associating it with the current operating condition (14), which is stored inside the first knowledge base (9) as a new problematic operating condition (10).

12. An automatic machine (1) for the production or the packaging of consumer products; the automatic machine (1) comprising:

a plurality of movable operating members, each capable of assuming a plurality of different positions;

a control unit (4);

a writable memory (6); and a data processing system (5);

the automatic machine (1) is characterized in that a first and a second knowledge base (9, 13) containing a plurality of possible problematic operating conditions (10) of the automatic machine (1) and at least one solution (12) for each problematic operating condition (10), respectively, are stored inside the memory (6); the automatic machine (1) being designed to carry out the method according to claim 1.

* * * * *